(12) United States Patent
Jarajapu et al.

(10) Patent No.: US 9,514,455 B2
(45) Date of Patent: Dec. 6, 2016

(54) MOBILE DEVICE PAYMENT

(71) Applicant: Wal-Mart Stores, Inc., Bentonville, AR (US)

(72) Inventors: Ravindra Jarajapu, San Jose, CA (US); Sandeep Pattanaik, Fremont, CA (US); Huynh Le, Daly City, CA (US); Jia Jun Chen, San Francisco, CA (US); Rahul Karwa, Fremont, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/010,503

(22) Filed: Jan. 29, 2016

(65) Prior Publication Data
US 2016/0148191 A1    May 26, 2016

Related U.S. Application Data

(63) Continuation of application No. 14/502,983, filed on Sep. 30, 2014, now Pat. No. 9,269,083.

(51) Int. Cl.
| | |
|---|---|
| *G06Q 20/10* | (2012.01) |
| *G06Q 20/34* | (2012.01) |
| *G06Q 20/32* | (2012.01) |
| *G06Q 20/40* | (2012.01) |
| *G06Q 20/38* | (2012.01) |
| *G07F 17/42* | (2006.01) |
| *G06Q 20/20* | (2012.01) |

(52) U.S. Cl.
CPC .......... *G06Q 20/342* (2013.01); *G06Q 20/105* (2013.01); *G06Q 20/204* (2013.01); *G06Q 20/322* (2013.01); *G06Q 20/3223* (2013.01); *G06Q 20/387* (2013.01); *G06Q 20/3821* (2013.01); *G06Q 20/40* (2013.01); *G06Q 20/4014* (2013.01); *G07F 17/42* (2013.01); *G06Q 2220/00* (2013.01)

(58) Field of Classification Search
CPC combination set(s) only.
See application file for complete search history.

(56) References Cited

U.S. PATENT DOCUMENTS

| | | |
|---|---|---|
| 7,347,361 B2 | 3/2008 | Lovett |
| 7,543,741 B2 | 6/2009 | Lovett |

(Continued)

OTHER PUBLICATIONS

Unibul Credit Card Blog, "Starbucks 'Mobile Play' Is a Huge Hit, but There Is a Better Way," http://blog.unibulmerchantservices.com/starbucks-mobile-pay-is-a-huge-hit-but-there-is-a-better-way/# comments, Aug. 13, 2014.

(Continued)

*Primary Examiner* — Christle I Marshall
(74) *Attorney, Agent, or Firm* — Bryan Cave LLP

(57) ABSTRACT

A method including receiving, from a mobile device, a payment method and a payment amount. The method also can include validating the payment amount. The method additionally can include generating a gift card for the payment amount. The gift card can include a gift card identifier. The method further can include sending the gift card identifier to the mobile device. The method additionally can include facilitating displaying the gift card identifier on the mobile device. The gift card can be devoid of being generated as part of a gift-card purchase transaction. Other embodiments are provided.

20 Claims, 10 Drawing Sheets

(56) References Cited

U.S. PATENT DOCUMENTS

| | | |
|---|---|---|
| 8,600,883 B2 | 12/2013 | Wong |
| 8,639,619 B1 * | 1/2014 | Priebatsch |
| 9,269,083 B1 * | 2/2016 | Jarajapu ............... G06Q 20/105 |
| 2011/0238473 A1 | 9/2011 | Sankolli et al. |
| 2013/0073429 A1 | 3/2013 | Narendra et al. |
| 2013/0132217 A1 | 5/2013 | Yahn et al. |
| 2013/0191279 A1 | 7/2013 | Calman et al. |
| 2013/0240622 A1 | 9/2013 | Zhou et al. |
| 2013/0268430 A1 * | 10/2013 | Lopez ................ G06Q 20/3433 705/39 |
| 2014/0343700 A1 * | 11/2014 | Soohoo ............. G06K 9/00342 700/91 |
| 2015/0088753 A1 | 3/2015 | Van Der Schueren |

OTHER PUBLICATIONS

Official Google Blog, "Insights from Googlers into our products, technology, and the Google culture," http://googleblog.blogspot.com/2011/05/coming-soon-make-your-phone-your-wallet.html, Aug. 11, 2014.

\* cited by examiner

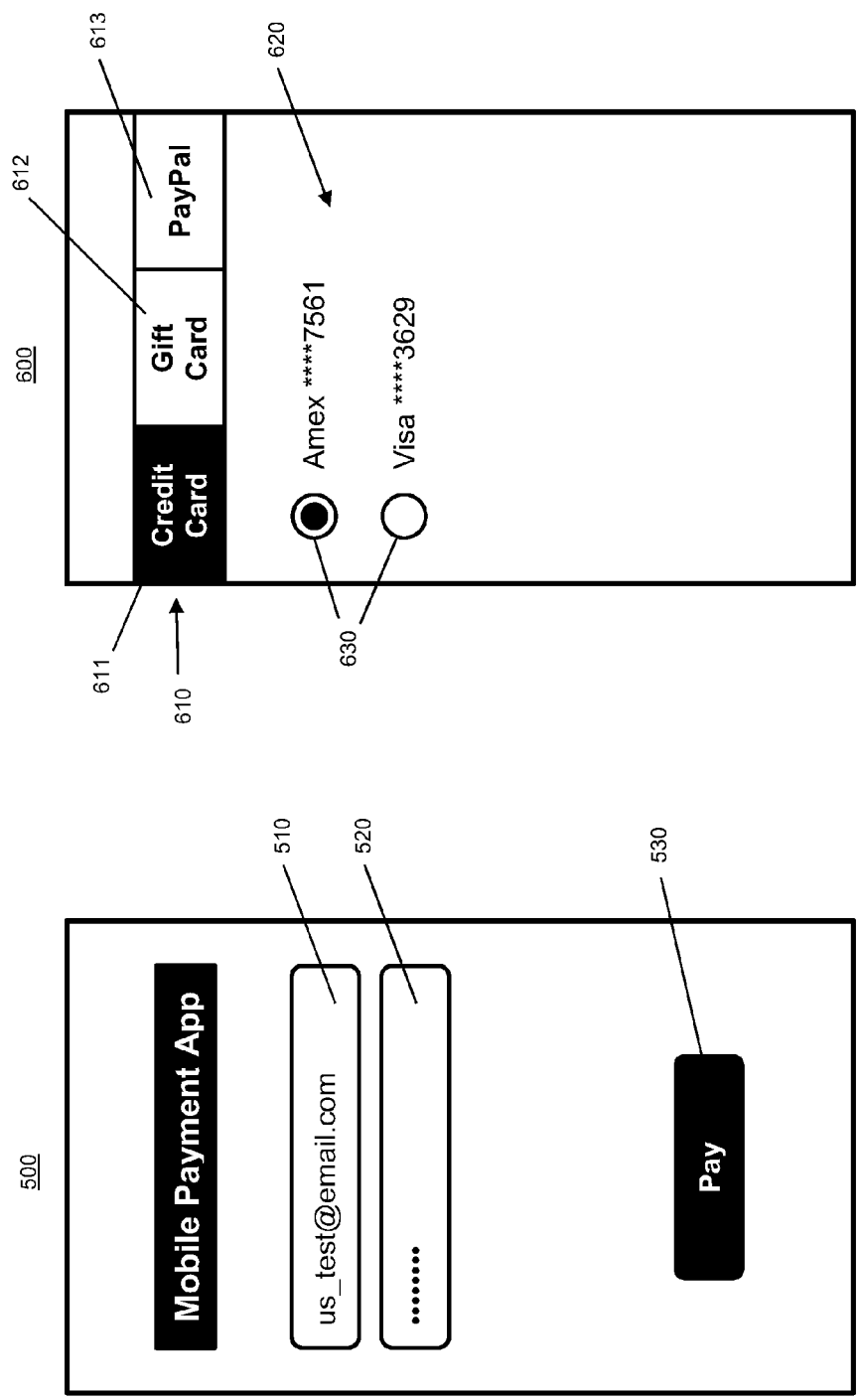

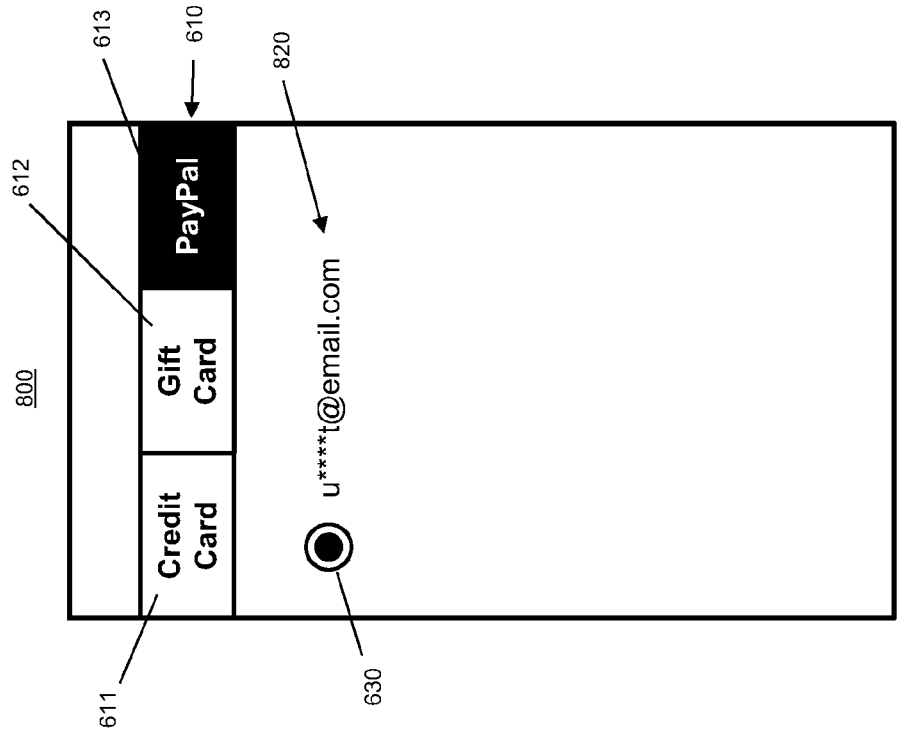
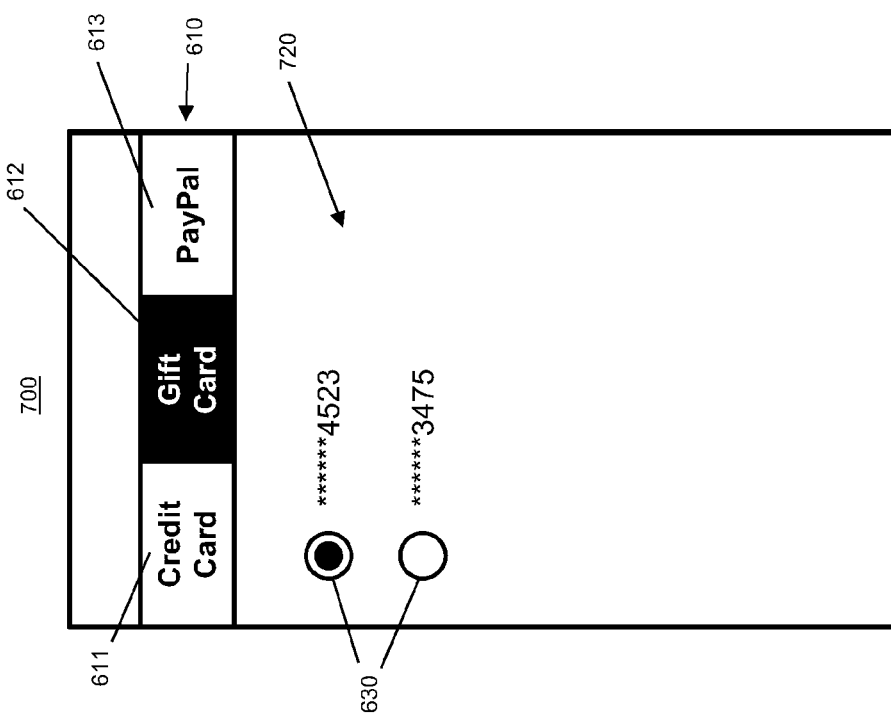
FIG. 8
FIG. 7

MOBILE DEVICE PAYMENT

CROSS-REFERENCE TO RELATED APPLICATIONS

This application is a continuation of U.S. patent application Ser. No. 14/502,983, filed Sep. 30, 2014. U.S. patent application Ser. No. 14/502,983 is incorporated herein by reference in its entirety.

TECHNICAL FIELD

This disclosure relates generally to facilitating financial transactions, and relates more particularly to facilitating retail transactions with a mobile device.

BACKGROUND

When paying for merchandise at traditional "brick-and-mortar" retail stores, consumers typically use cash, checks, or payment cards, such as credit cards or debit cards. It can be inconvenient for customers to carry cash, check, and/or payment cards. Moreover, there is a risk of loss or theft when carrying and using such payment instruments, which can result fraudulent transactions and/or financial loss.

Mobile devices, such as smartphones, are now in common use. These devices can be used for a variety of activities, such as conducting phone calls, capturing pictures and video, browsing the Internet, and using mobile applications.

BRIEF DESCRIPTION OF THE DRAWINGS

To facilitate further description of the embodiments, the following drawings are provided in which:

FIG. 5 illustrates an exemplary screenshot of a user interface of the payment module as displayed on the screen of the mobile device of FIG. 3, showing a login procedure;

FIG. 6 illustrates an exemplary screenshot of a user interface of the payment module as displayed on the screen of the mobile device of FIG. 3, showing a payment method selection procedure for credit cards;

FIG. 7 illustrates an exemplary screenshot of a user interface of the payment module as displayed on the screen of the mobile device of FIG. 3, showing a payment method selection procedure for gift cards;

FIG. 8 illustrates an exemplary screenshot of a user interface of the payment module as displayed on the screen of the mobile device of FIG. 3, showing a payment method selection procedure for online payment accounts;

Figure 1:
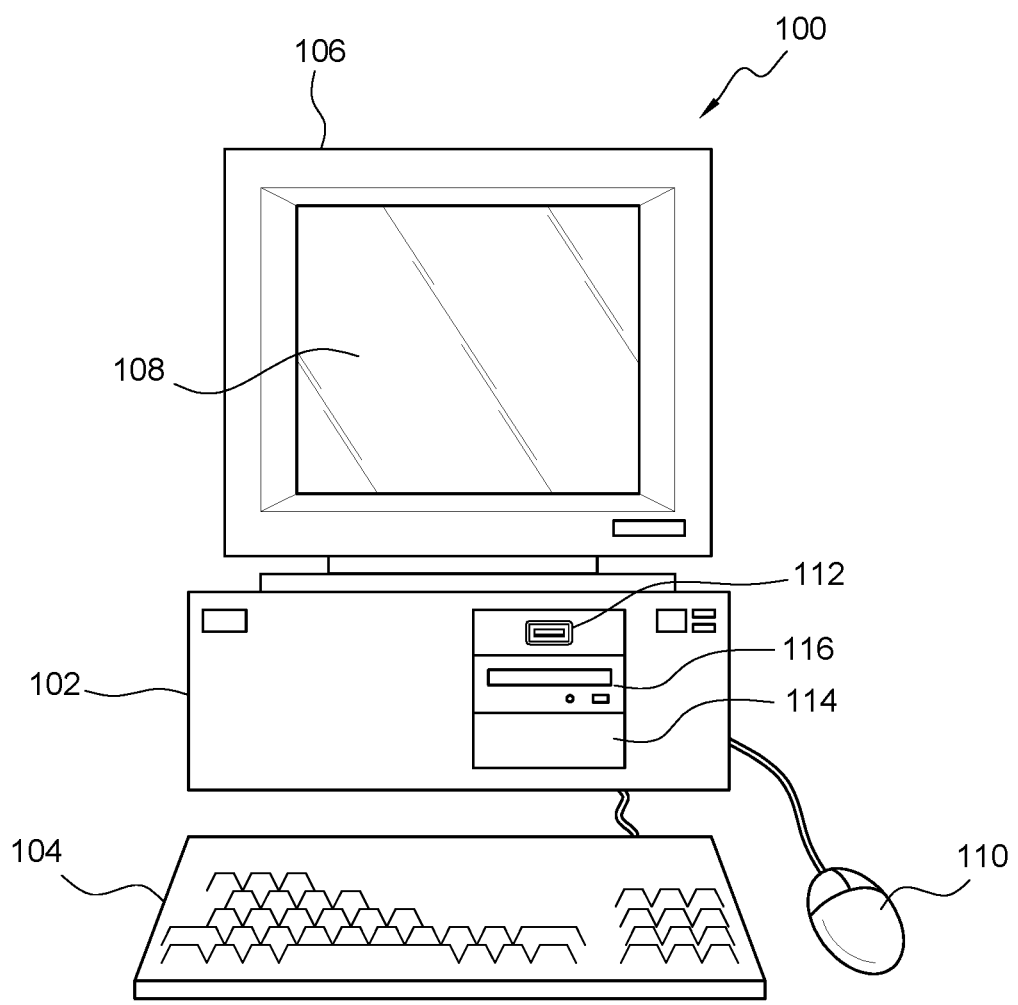
FIG. 1 illustrates a front elevational view of a computer system that is suitable for implementing various embodiments of the systems disclosed in FIGS. 3 and 14.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method. The method can include receiving, from a mobile device, a payment method and a payment amount. The method also can include validating the payment amount. The method further can include generating a gift card for the payment amount. The gift card can include a gift card identifier. The method additionally can include sending the gift card identifier to the mobile device. The method further can include displaying the gift card identifier on the mobile device.

A number of embodiments include a system. The system can include a payment module configured to be executed on a mobile device. The payment module can be further configured to receive a payment method and a payment amount. The system also can include a retailer payment system. The retailer payment system can be configured to communicate with the payment module on the mobile device. The retailer payment system can be further configured to receive the payment method and the payment amount from the payment module, at least partially validate the payment amount, and generate a gift card for the payment amount. The gift card can include a gift card identifier. The payment module can be further configured to receive the gift card identifier from the retailer payment system, and display the gift card identifier on a screen of the mobile device.

Various embodiments include a method. The method can include receiving, from a mobile device, a payment method and a payment amount. The method also can include validating the payment amount. The method additionally can include generating a gift card for the payment amount. The gift card can include a gift card identifier. The method further can include sending the gift card identifier to the mobile device. The method additionally can include facilitating displaying the gift card identifier on the mobile device. The gift card can be devoid of being generated as part of a gift-card purchase transaction.

A number of embodiments include a system. The system can include a payment module configured to be executed on a mobile device and further configured to receive a payment method and a payment amount. The system also can include a retailer payment system configured to communicate with the payment module on the mobile device. The retailer payment system can be further configured to receive the payment method and the payment amount from the payment module, at least partially validate the payment amount, and generate a gift card for the payment amount. The gift card can include a gift card identifier. The payment module can be further configured to receive the gift card identifier from the retailer payment system, and facilitate display of the gift card identifier on a screen of the mobile device. The gift card can be devoid of being generated as part of a gift-card purchase transaction.

Figure 2:
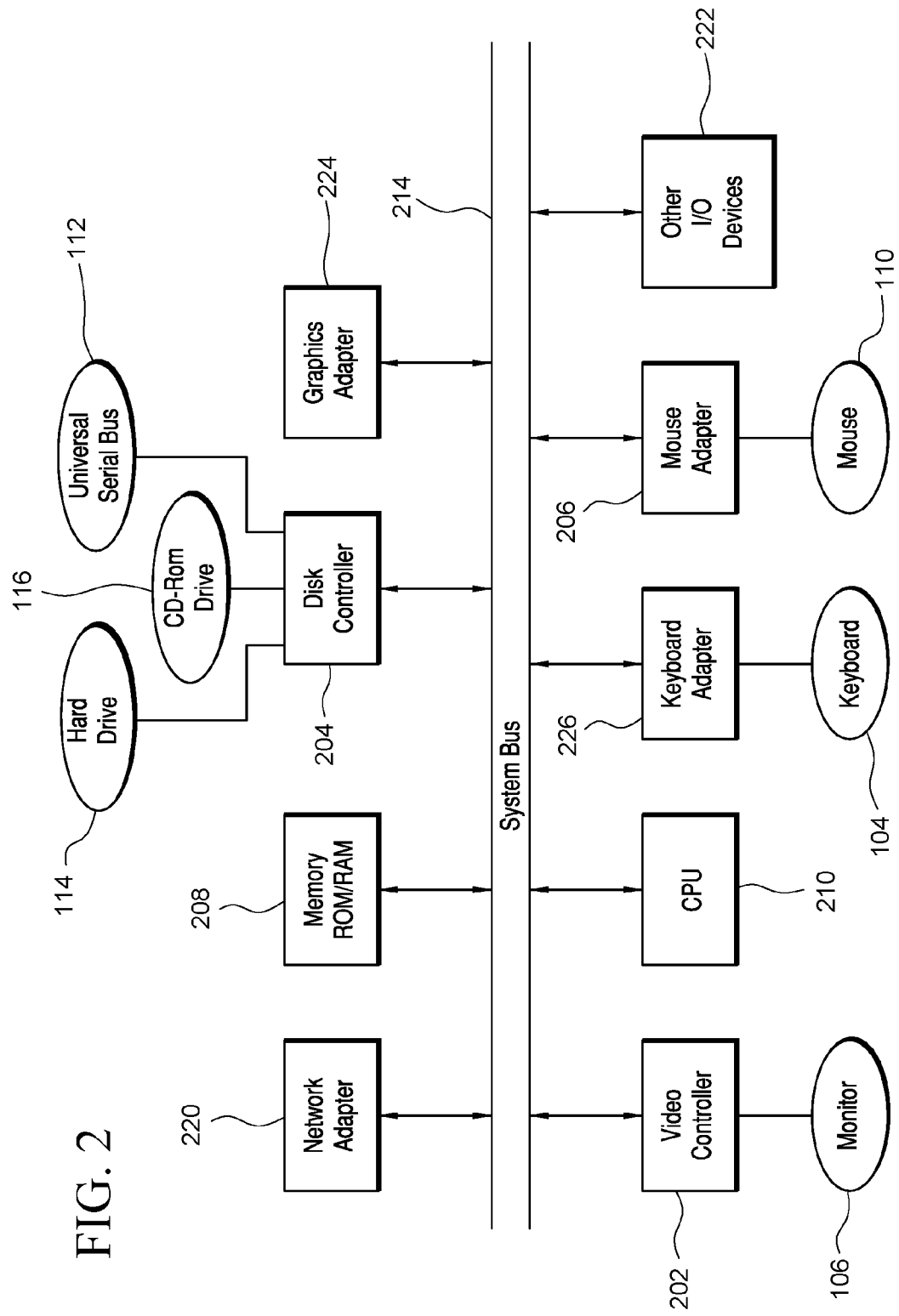
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
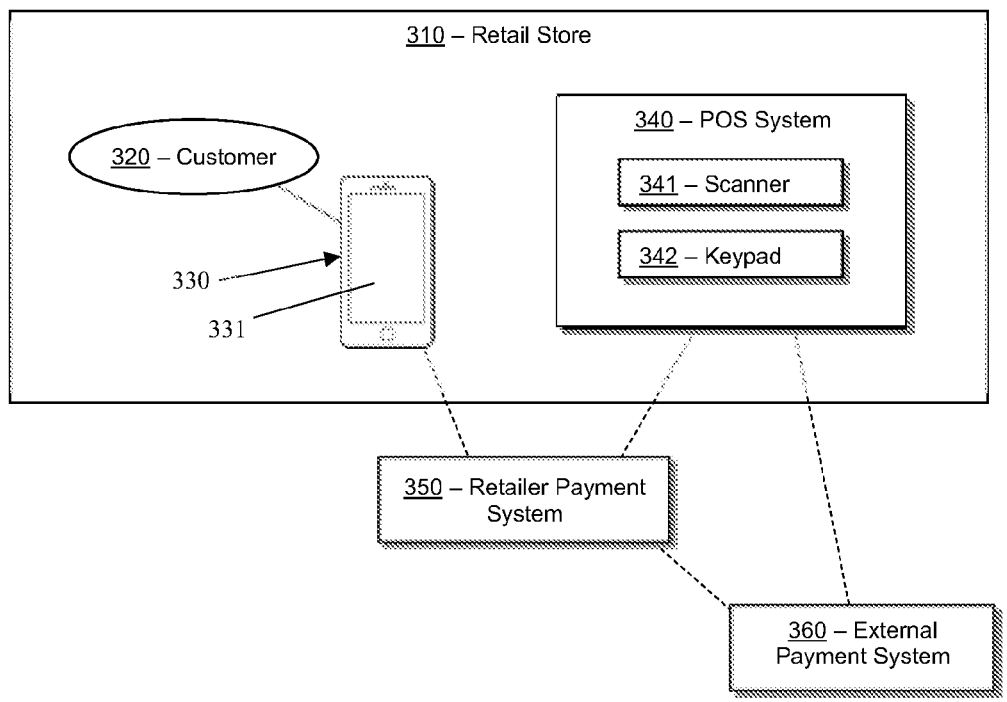
FIG. 3 illustrates a block diagram of a system, all or portions of which can be employed for mobile device payment, according to an embodiment.

Turning ahead in the drawings, FIG. 3 illustrates a block diagram of a system 300, all or portions of which can be employed for mobile device payment, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300.

In some embodiments, system 300 can include a retailer payment system 350. Retailer payment system 350 can be a computer system, such as computer system 100 (FIG. 1), as described above, and can be a single computer, a single server, or a cluster or collection of computers or servers, or a cloud of computers or servers. In various embodiments, retailer payment system 350 can be used by a retailer for fully or partially process transactions made through one or more eCommerce websites and/or at physical ("brick and mortar") stores. In various embodiments, when an customer purchases chooses to "check out" a virtual shopping cart on the retailer's eCommerce website, retailer payment system 350 can process the payment for the transaction. As an example, retailer payment system 350 can process one or more credit cards, one or more gift cards, one or more online payment accounts (such as PayPal), and/or other suitable online payment methods. In a number of embodiments, retailer payment system 350 can store the payment methods used by customers on the eCommerce website.

In several embodiments, retailer payment system 350 can allow customers to setup payment methods without processing a transaction. For example, a customer can enter a payment method, such as a credit card account, without processing a transaction, so that the information will be stored in retailer payment system 350 for ready access in the future. In many embodiments, retailer payment system 350 can store these payment methods in an account for each customer. In several embodiments, a customer can have a login username and password to access the account online and to setup payment information and/or process online payments.

In various embodiments, the retailer can have one or more physical stores, such as retail store 310. In many embodiments, retail store 310 can include one or more point-of-sale (POS) systems, such as POS system 340. In many embodiments, POS system 340 can be used to "check out" a customer from a retail store, which can include determining which items the customer desires to purchase, determining the total purchase price for those items, and processing payment for the total purchase price. In many embodiments, POS system 340 can process payments through cash, check, payment cards (e.g., credit cards, debit cards, gift cards, etc.), and/or other suitable payment methods.

In a number of embodiments, POS system 340 can include a scanner 341 and/or a keypad 342. In many embodiments, scanner 341 can be an optical scanner, such as a barcode reader, which can be used to scan barcodes, such as Universal Product Code (UPC) barcodes on products, and/or barcodes on coupons, gift cards, etc. In many embodiments, keypad 342 can be used to enter numeric or alphanumeric codes, such as numeric or alphanumeric codes corresponding to barcodes on products, coupons, gift cards, etc.

In many embodiments, POS system 340 can process a check-out transaction using a traditional gift card, which can be a physical payment card that was purchased for a predetermined amount or an amount determined upon purchasing the gift card. In some embodiments, gift cards can be "reloaded," such as by adding funds to an existing gift card. In many embodiments, virtual gift cards can be purchased online and used for eCommerce purchases, and can be similar to a traditional physical gift card. In a number of embodiments, physical gift cards and/or virtual gift cards can be used for in-store and/or eCommerce purchases. In many embodiments, the POS system 340 and/or retailer payment system 350 can process the physical and/or virtual gift cards based on a unique identifier that identifies each gift card account.

In several of embodiments, retailer payment system 350 and/or POS system 340 can be in data communication with one or more external payment systems, such as external payment system 360. External payment system 360 can be a computer system, such as computer system 100 (FIG. 1), as described above, and can be a single computer, a single server, or a cluster or collection of computers or servers, or a cloud of computers or servers. In many embodiments, external payment system can be operated by one or more entities different from the retailer, and can handle payment processing for various payment cards, such as credit cards, debit cards, etc. For example, in some embodiments, external payment system 360 can include a system for an acquiring (merchant/retailer) bank, a payment card system, and a system for an issuing (cardholder) bank, as is generally used in conventional credit card transactions. In a number of embodiments, external payment system 360 can be a payment system for online payment accounts, such as PayPal. In many embodiments, when a customer presents POS system 340 with a payment card, POS system 340 can communicate with external payment system 360 to process the payment card. In some embodiments, when the customer presents POS system 340 with a payment card, POS system 340 can communicate with retailer payment system 350, which in turn can communicate with external payment system 360 to process the payment card.

In various embodiments, a customer, such as customer 320, in retail store 310 can carry a mobile device, such as mobile device 330. Mobile device 330 can be a portable computer system, such as computer system 100 (FIG. 1), as described above. For example, mobile device 330 can be a smartphone (e.g., an iPhone, a Samsung Galaxy S, etc.), a tablet computing device (e.g., an iPad, a Samsung Galaxy Tab, etc.), or another suitable mobile device. In many embodiments, mobile device 330 can include a screen, such as screen 331. Screen 331 can be an electronic visual display, which can be similar to refreshing monitor 106 (FIG. 1). For example, screen 331 can be a touchscreen. In several embodiments, mobile device 330 can be capable of wirelessly communicating to a wireless communications network, such as through a mobile telecommunications data network (e.g., Fourth Generation (4G) Long Term Evolution (LTE) data network), a Wi-Fi (Wireless Fidelity) network, or another suitable wireless communications network.

In many embodiments, mobile device 330 can support mobile applications, which can be part of the operating system, pre-installed before the time of purchasing the mobile device, and/or installed after purchasing the mobile device, such as installed by customer 320. In some embodiments, mobile device 330 can include a payment module, such as payment module 1410 (shown in FIG. 14 and described below). In many embodiments, the payment module can be a mobile application. In several embodiments, the payment module can communicate with retailer payment system 350 to allow customer 320 to complete a check-out transaction at retail store 310 using mobile device 330. In many embodiments, customer 320 can pay using mobile device 330 rather than by physically presenting cash, checks, payment cards, and/or other payment instruments at POS system 340 in retail store 310.

In many embodiments, the payment module of mobile device 330 can communicate with retailer payment system 350 to process payments made using mobile device 330. In a number of embodiments, retailer payment system 350 can communicate with external payment system 360 to process an underlying payment method. For example, customer 320 can choose to pay through mobile device 330 using a credit card that has been previously setup in retailer payment system 350, and retailer payment system 350 can process the credit card transaction by communicating with external payment system 360, similarly to how retailer payment system 350 can communicate with external payment system 360 when processing an online order at the retailer's eCommerce website using the credit card. In some embodiments, customer 320 can choose to pay through mobile device 330 using a gift card for the retailer that was previously setup in retailer payment system 350. In some such embodiments, retailer payment system 350 can process the gift card without communicating with external payment system 360.

Figure 4:
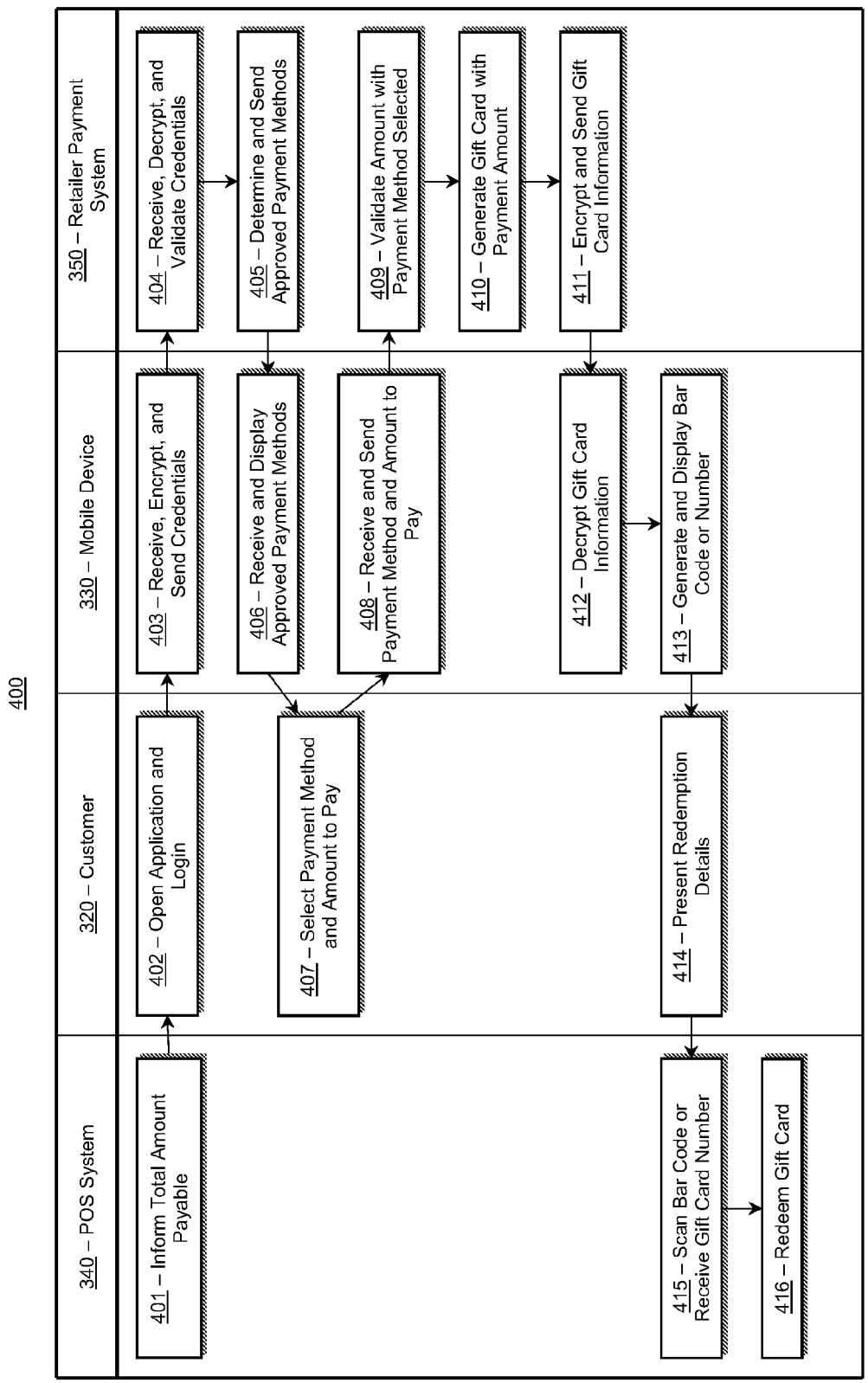
FIG. 4 illustrates an exemplary workflow for mobile device payment, according to an embodiment.

Turning ahead in the drawings, FIG. 4 illustrates an exemplary workflow 400 for mobile device payment, according to various embodiments. Workflow 400 is merely exemplary and is not limited to the embodiments presented herein. Workflow 400 can be employed in many different embodiments or examples not specifically depicted or described herein. In some embodiments, the procedures, the processes, and/or the activities of workflow 400 can be performed in the order presented. In other embodiments, the procedures, the processes, and/or the activities of workflow 400 can be performed in any suitable order. In still other embodiments, one or more of the procedures, the processes, and/or the activities of workflow 400 can be combined or skipped.

In some embodiments, workflow 400 can begin with a block 401 of POS system 340 informing the total amount payable. For example, after customer 310 finishes selecting items to purchase in retail store 310 (FIG. 3), POS system can process the items (e.g., scan the barcode for each item), and determine a total amount that customer 320 should pay for the items. In some embodiments, POS system 340 can display the total amount payable, and/or a clerk at POS system 340 can inform customer 320 of the total amount payable.

In various embodiments, workflow 400 can continue with a block 402 of opening a mobile payment application and/or logging in to the mobile payment application. In a number of embodiments, customer 320 can open a mobile payment application, such as payment module 1410 (FIG. 14, described below), on mobile device 330 and/or login to the payment module. FIG. 5 illustrates an exemplary screenshot 500 of a user interface of the payment module as displayed on screen 331 (FIG. 3) of mobile device 330 (FIGS. 3-4), showing a login procedure, according to various embodiments. Screenshot 500 is merely exemplary, and embodiments for mobile device payment can be employed in many different embodiments or examples not specifically depicted or described herein. In some embodiments, the payment module of mobile device 330 (FIGS. 3-4) can provide a user interface, such as shown in screenshot 500, which can allow customer 320 (FIGS. 3-4) to login to the payment module. In some embodiments, screenshot 500 can include a username field 510 and/or a password field 520, which customer 320 (FIGS. 3-4) can use to enter credentials, such as a username and/or a password, respectively. In many embodiments, screenshot 500 can include a button 530, which can be selected by customer 320 (FIGS. 3-4) after entering the credentials. In a number of embodiments, the credentials can be used to identify the identity of customer 320 (FIGS. 3-4). In several embodiments, the login procedure can advantageously prevent persons other than customer 320 (FIGS. 3-4) from using the payment module to access payment methods associated with customer 320 (FIGS. 3-4) in the account of customer 320 (FIGS. 3-4) in retailer payment system 350 (FIGS. 3-4).

Returning to FIG. 4, in many embodiments, workflow 400 can continue with a block 403 of mobile device 330 receiving the credentials from customer 320, encrypting the credentials, and/or sending the encrypted credentials to retailer payment system 350. For example, the credentials can be received in mobile device 330 as shown in FIG. 5, described above. In several embodiments, the credentials can be encrypted in mobile device 330 to prevent credentials from being accessed and/or used by unintended persons.

In a number of embodiments, workflow 400 can continue with a block 404 of retailer payment system 350 receiving the encrypted credentials, decrypting the encrypted credentials, and/or validating the credentials. In many embodiments, when retailer payment system 350 validates the credentials, if the credentials do not exactly match for an account in retailer payment system 350, retailer payment system can reject the login attempt. In some embodiments, flow can return to block 402 to allow customer 320 to attempt to login again.

If the credentials are validated, workflow 400 can continue with a block 405 of retailer payment system 350 determining approved payment methods for customer 320, and/or sending the approved payment methods to mobile device 330. For example, customer 320 can have an account in retailer payment system 350, which can include one or more payment methods. As described above, the payment methods can be setup prior to processing the mobile payment using mobile device 330, and can include one or more credit cards, one or more gift cards, one or more online payment accounts (such as PayPal), and/or other suitable online payment methods.

In many embodiments, the approved payment methods that have been setup for customer 320 in retailer payment system 350 can be sent to mobile device 330. In some embodiments, the payment methods can be sent to mobile device 330 in a redacted format to omit transmittal of the full details of the one or more payment methods. For example, a Visa credit card can be stored in the account for customer 320 (FIG. 3-4) in retailer payment system 350, and can have a sixteen digit credit card number, an expiration date, a cardholder name, a billing address, a security code, and/or other suitable information for processing the payment. For security, when retailer payment system 350 sends the payment method to mobile device 330, retailer payment system 350 can transfer an identifier for the card, such as "Visa **3629," which can be sufficient information for customer 320** to identify the credit card, but insufficient information for a third party to use the credit card to process a payment.

In a number of embodiments, workflow 400 can continue with a block 406 of mobile device 330 receiving the approved payment methods and/or displaying the approved payment methods. In many embodiments, the payment module of mobile device 330 can display the payment methods on screen 331 (FIG. 3) through a user interface. FIG. 6 illustrates an exemplary screenshot 600 of a user interface of the payment module as displayed on screen 331 (FIG. 3) of mobile device 330 (FIGS. 3-4), showing a payment method selection procedure for credit cards, according to various embodiments. FIG. 7 illustrates an exemplary screenshot 700 of a user interface of the payment module as displayed on screen 331 (FIG. 3) of mobile device 330 (FIGS. 3-4), showing a payment method selection procedure for gift cards, according to various embodiments. FIG. 8 illustrates an exemplary screenshot 800 of a user interface of the payment module as displayed on screen 331 (FIG. 3) of mobile device 330 (FIGS. 3-4), showing a payment method selection procedure for online payment accounts, according to various embodiments. Screenshots 600, 700, and 800 in FIGS. 6, 7, and 8, respectively, are merely exemplary, and embodiments for mobile device payment can be employed in many different embodiments or examples not specifically depicted or described herein. In some embodiments, the payment module of mobile device 330 (FIGS. 3-4) can provide a user interface, such as shown in screenshots 600, 700, and 800, which can allow customer 320 (FIGS. 3-4) to view approved payment methods and/or select a payment method from the approved payment methods. In several embodiments, the approved payment methods can be displayed on mobile device 330 in menus, as shown in FIGS. 6-8. In other embodiments, the approved payment method can be displayed on mobile device 330 in another suitable format, such a single listing for all approved payment methods.

As shown in FIG. 6, in some embodiments, screenshot 600 can include payment method menu bar 610. Payment method menu bar 610 can include menus for various approved payment methods, such as a credit card menu 611, a gift card menu 612, and/or an online payment account menu 613. In various embodiments, customer 320 (FIGS. 3-4) can select one of the menus (e.g., 611, 612, 613), to list the approved payment methods of that type. For example, as shown in FIG. 6, customer 320 (FIGS. 3-4) can select credit card menu 611. In many embodiments, screenshot 600 can include a credit card listing 620, which can display approved payment methods in which the type of the payment method is credit card. For example, as shown in FIG. 6, credit card listing 620 can include two credit cards, one for "Amex **7561," and one for "Visa 3629." In a number of embodiments, screenshot 600 can include one or more option buttons 630, which can be used by customer 320 (FIGS. 3-4) to select a payment method from the payment methods listed, such as in credit card listing 620**.

As shown in FIG. 7, in many embodiments, screenshot 700 can be similar to screenshot 600 (FIG. 6), and various elements of screenshot 700 can be similar or identical to various elements of screenshot 600 (FIG. 6). For example, screenshot 700 can include menu bar 610, and can show the selection of gift card menu 612. In several embodiments, as shown in FIG. 7, customer 320 (FIGS. 3-4) can select gift card menu 612, which can result in screenshot 700 displaying a gift card listing 720, which can display approved payment methods in which the type of the payment method is gift card. For example, as shown in FIG. 7, gift card listing 720 can include two gift cards, one for "****4523," and one for "**3475." In a number of embodiments, screenshot 700 can include option buttons 630, which can be used by customer 320 (FIGS. 3-4) to select a payment method from the payment methods listed, such as in gift card listing 720**.

As shown in FIG. 8, in several embodiments, screenshot 800 can be similar to screenshot 600 (FIG. 6) and/or screenshot 700 (FIG. 7), and various elements of screenshot 800 can be similar or identical to various elements of screenshot 600 (FIG. 6) and/or screenshot 700 (FIG. 7). For example, screenshot 800 can include menu bar 610, and can show the selection of online payment account menu 613. In several embodiments, as shown in FIG. 8, customer 320 (FIGS. 3-4) can select online payment account menu 613, which can result in screenshot 800 displaying an online payment account listing 820, which can display approved payment methods in which the type of the payment method is online payment account, such as PayPal. For example, as shown in FIG. 8, online payment account listing 820 can include one online payment account, one for "u**t@email.com," which can be a redacted form of a username corresponding to the online payment account. In a number of embodiments, screenshot 800 can include option button 630, which can be used by customer 320**

(FIGS. 3-4) to select a payment method from the payment methods listed, such as in online payment account listing 820.

Figure 9:
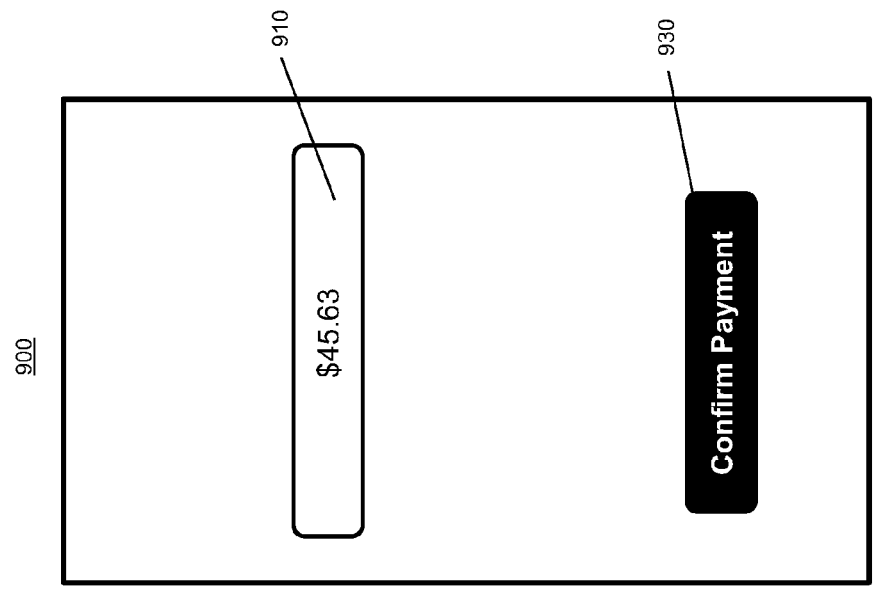
FIG. 9 illustrates an exemplary screenshot of a user interface of the payment module as displayed on the screen of the mobile device of FIG. 3, showing a payment amount input procedure.

Returning to FIG. 4, in several embodiments, workflow 400 can continue with a block 407 of customer 320 selecting a payment method from the approved payment methods and/or selecting an amount to pay. For example, customer 320 can select a payment method as shown in FIGS. 6-8, as described above. FIG. 9 illustrates an exemplary screenshot 900 of a user interface of the payment module as displayed on screen 331 (FIG. 3) of mobile device 330 (FIGS. 3-4), showing a payment amount input procedure, according to various embodiments. Screenshot 900 is merely exemplary, and embodiments for mobile device payment can be employed in many different embodiments or examples not specifically depicted or described herein. In some embodiments, the payment module of mobile device 330 (FIGS. 3-4) can provide a user interface, such as shown in screenshot 900, which can allow customer 320 (FIGS. 3-4) to input a payment amount. In many embodiments, screenshot 900 can include a payment amount field 910, in which customer 920 (FIGS. 3-4) can input a payment amount. For example, the payment amount can be the total amount payable provided by POS system 340 (FIGS. 3-4). In several embodiments, screenshot 900 can include a button 930, which can be selected by customer 920 (FIGS. 3-4) to confirm payment, such as after a payment amount has been entered in payment amount field 910.

Returning to FIG. 4, in a number of embodiments, workflow 400 can continue with a block 408 of mobile device 330 receiving the payment method and/or payment amount, and/or sending the payment method and/or payment amount to retailer payment system 350. For example, mobile device 330 can receive the payment method from customer 320 as shown in FIGS. 6-8, described above. Mobile device 330 can receive the payment amount as shown in FIG. 9, described above. In a number of embodiments, after receiving the payment method and/or payment amount, mobile device 330 can send the payment method and/or payment amount to retailer payment system 350.

In many embodiments, workflow 400 can continue with a block 409 of retailer payment system 350 receiving the payment method and/or payment amount, and/or validating the payment amount with the payment method. For example, after receiving the payment method and/or payment amount from mobile device 330, retailer payment system 350 can determine whether the payment method selected by customer 320 has sufficient funds to pay the payment amount entered by customer 320. In many embodiments, if there are sufficient funds using the selected payment method to pay the payment amount, retailer payment system can process a payment for the payment amount using the payment method. In some embodiments, retailer payment system 350 can communicate with one or more external payment system, such as external payment system 360, to determine whether the payment method has sufficient funds and/or to process the payment for the payment amount using the payment method, as described above.

In certain embodiments, retailer payment system 350 and/or the payment module on mobile device 330 can support an additional identity authentication procedure, such as a 3-D Secure (3DS) procedure to provide an additional layer of security, such as for payment methods using a payment card (e.g., credit card, debit card). For example, the 3DS procedure can be Verified by Visa, MasterCard SecureCode, J/Secure, American Express SafeKey, or another suitable identity authentication procedure. For example, when retailer payment system 350 attempts to process a payment using the payment card, external payment system 360 can notify retailer payment system 350 that customer 320 has setup a 3DS requirement on the payment card for online transactions. Retailer payment system 350 can prompt mobile device 330 to proceed with an additional authentication procedure, which in some embodiments can involve mobile device 330 communicating with external payment system 360, either directly or through retailer payment system 350. In many embodiments, the identity authentication procedure can beneficially provide additional security for processing the mobile payment using mobile device 330 when using a payment card as the payment method.

In some embodiments, workflow 400 can continue with a block 410 of retailer payment system 350 generating a gift card for the payment amount. In many embodiments, the gift card can be an intermediate gift card, which can be generated solely for the purpose of processing one or more payments using mobile device 330. In several embodiments, the gift card can be generated in real time. In a number of embodiments, the gift card can be newly generated by retailer payment system 350. In various embodiments, customer 320 can be unaware that retailer payment system 350 has generated a gift card to facilitate processing of the payment using mobile device 330. In several embodiments, the gift card can be generated to process the payment using mobile device 330, rather than being generated as part of a gift-card purchase transaction. In many embodiments, the gift card can be a virtual gift card. In various embodiments, the gift card can be issued by the retailer, such as for use in stores and/or eCommerce website that are operated by the retailer. In a number of embodiments, the gift card can include a gift card identifier, such as one or more numbers that identify the gift card.

In several embodiments, workflow 400 can continue with a block 411 of retailer payment system 350 encrypting the gift card information and/or sending the gift information to mobile device 330. For example, retailer payment system 350 can encrypt the gift card identifier and/or send the encrypted gift card identifier to mobile device 330.

In a number of embodiments, workflow 400 can continue with a block 412 of mobile device 330 receiving the encrypted gift card information and/or decrypting the gift card information.

In various embodiments, workflow 400 can continue with a block 413 of mobile device 330 generating a barcode and/or displaying the barcode and/or gift card information. In several embodiments, mobile device can generate a barcode using the gift card identifier. For example, the barcode can be a one-dimensional barcode, such as a UPC barcode, or a two-dimensional barcode, such as a QR (quick response) code. In many embodiments, the barcode can be of a format that can be scanned by POS system 340. For example, the barcode can be of a format such as a barcode found on the back of a physical gift card issued by the retailer. In many embodiments, the gift card identifier can be displayed on screen 331 (FIG. 3), such as by displaying the number of the gift card identifier and/or the barcode corresponding to the gift card identifier.

Figure 10:
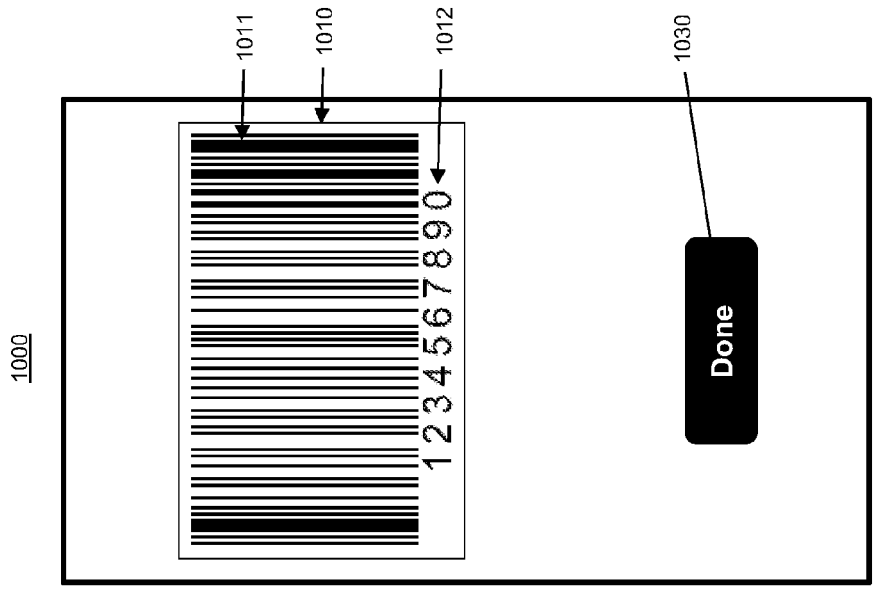
FIG. 10 illustrates an exemplary screenshot of a user interface of the payment module as displayed on the screen of the mobile device of FIG. 3, showing a display of the gift card identifier.

FIG. 10 illustrates an exemplary screenshot 1000 of a user interface of the payment module as displayed on screen 331 (FIG. 3) of mobile device 330 (FIGS. 3-4), showing a display of the gift card identifier, according to various embodiments. Screenshot 1000 is merely exemplary, and embodiments for mobile device payment can be employed in many different embodiments or examples not specifically depicted or described herein. In some embodiments, the payment module of mobile device 330 (FIGS. 3-4) can provide a user interface, such as shown in screenshot 1000, which can display a gift card identifier display box 1010. In many embodiments, gift card display box 1010 can include a gift card identifier barcode 1011 and/or a gift card identifier number 1012. Gift card identifier barcode 1011 can be the barcode corresponding to the gift card identifier. Gift card identifier number 1012 can be the number of the gift card identifier, which can be a numeric or alphanumeric code. In several embodiments, screenshot 1000 can include a button 1030, which can be selected by customer 920 (FIGS. 3-4) after the gift card identifier has been input in POS system 340 (FIGS. 3-4), as described below, to close out the payment module on mobile device 330 (FIGS. 3-4).

Returning to FIG. 4, in many embodiments, workflow 400 can continue with a block 414 of customer 320 presenting redemption details on mobile device 330 to POS system 340. For example, the redemption details can include the gift card identifier, such as displayed on screen 331 (FIG. 3) of mobile device 330 in gift card identifier barcode 1011 (FIG. 10) and/or gift card identifier number 1012 (FIG. 10).

In a number of embodiments, workflow 400 can continue with a block 415 of POS system 340 scanning gift card identifier barcode 1011 (FIG. 10), receiving gift card identifier number 1012 (FIG. 10), and/or otherwise receiving the gift card identifier for the gift card generated by retailer payment system 350. For example, in some embodiments, scanner 341 (FIG. 3) of POS system 340 can scan gift card identifier barcode 1011 (FIG. 10) to input the gift card identifier in POS system 340. In a number of embodiments, keypad 341 (FIG. 3) of POS system 340 can be used, such as by a clerk or customer 320, to input gift card identifier number 1012 (FIG. 10) to input the gift card identifier in POS system 340.

In various embodiments, workflow 400 can continue with a block 416 POS system 340 redeeming the gift card. For example, the gift card identifier can be processed by POS system 340 similarly as a physical gift card is processed by POS system 340 to process a payment using the gift card for the total amount payable. In some embodiments, POS system 340 can communicate with retailer payment system 350 to process the redemption of the gift card and/or close out the gift card.

In some embodiments, the payment module on mobile device 330 and/or retailer payment system 350 can be configured to allow customer 320 to select more than one payment method, such as by iterating through block 407, and generating a gift card using funds from multiple payment sources.

In several embodiments, the payment module on mobile device 330 can be used to pay a portion of the total amount payable, such as by customer 320 paying partially with one or more direct payment methods at POS system 340 (e.g., cash), and paying the balance of the total amount payable using the payment module on mobile device 330, as described above. In some embodiments, if customer 320 proceeds through the mobile device payment procedure, as described above, but instead pays using a direct payment method or cancels the "checkout" transaction, retailer payment system 350 can refund the funds on the gift card to the selected payment method, such as after 1, 2, 6, 12, 24, or 48 hours, for example.

In a number of embodiments, the payment module on mobile device 330, retailer payment system 350, and POS system 340 can be configured to generate a unique identifier, such as a token, instead of generating a gift card. In many embodiments, the token can be displayed on mobile device 330, such as by using a barcode. In a number of embodiments, POS system 340 can send the token to retailer payment system 350, which can then charge the selected payment method after the barcode is presented to POS system 340. In many embodiments, retailer payment system 350 can transmit a successful transaction of the underlying payment method to POS system 340, which can allow POS system 340 to close out the transaction.

In a number of embodiments, payment using mobile device 330 can use an intermediate gift card, as described above, which can beneficially provide increased security by preventing the details of the underlying payment method from being transmitted to and/or accessed by mobile device 330 and/or POS system 340. In several embodiments, the intermediate gift card can be the only payment method accessible to mobile device 330 and/or POS system 340. In several embodiments, the gift card can be of limited duration, such that it can be closed out immediately after POS system 340 redeems the gift card, or shortly thereafter (e.g., 24 hours or 48 hours later). In some embodiments, the gift card can be reused for future mobile device payment transactions by customer 320.

In many embodiments, retailer payment system 350 can generate a gift card for processing the mobile device payment even when customer 320 selects a gift card as the payment method, such as shown in FIG. 7, described above. Using an intermediate gift card can beneficially provide additional security by preventing the details of the underlying gift cards from being transmitted to and/or accessed by mobile device 330 and/or POS system 340. For example, customer 320 can have a large amount of funds on an underlying gift card payment method, and the intermediate gift card can have a smaller amount of funds that is merely sufficient to cover the amount payable at POS system 340.

In several embodiments, the mobile device payment procedures and/or systems described above that use an intermediate gift card can beneficially allow POS system 340 to process a payment using mobile device 330 without making any changes to POS system 340, as POS system 340 can be already configured to process and redeem gift cards. In many embodiments, a token-based payment method can necessitate changes to POS system 340.

In some embodiments, the mobile device payment procedures and/or systems described above can advantageously allow customer 320 to shop at retail stores of the retailer, such as retail store 310 (FIG. 3), without carrying any cash, checks, payment cards, and/or other payment instruments, which can beneficially prevent loss and/or theft of such payment instruments, and/or fraud involving such payment instruments.

Figure 11:
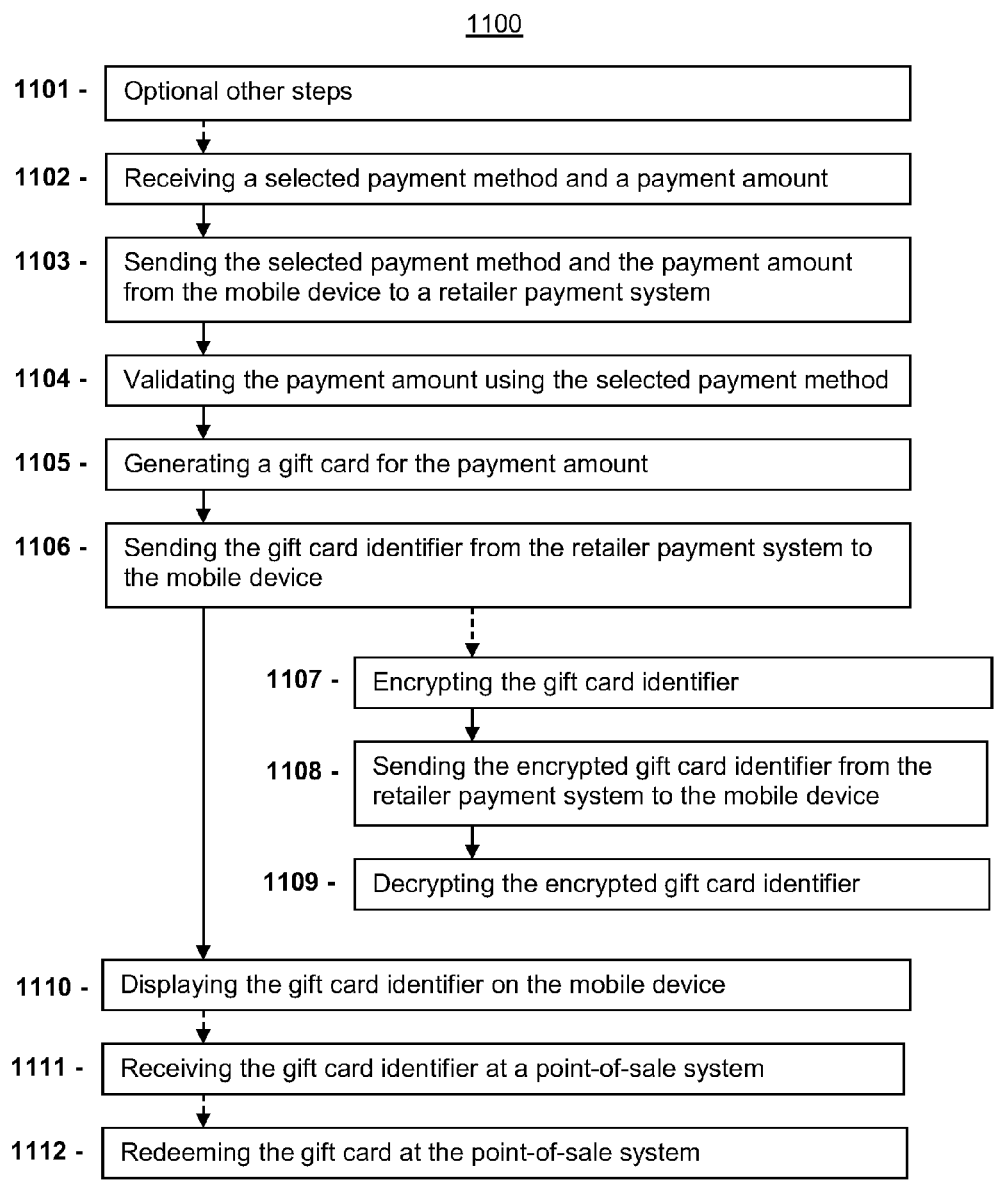
FIG. 11 illustrates a flow chart for a method of mobile device payment, according to another embodiment.

Turning ahead in the drawings, FIG. 11 illustrates a flow chart for a method 1100 of mobile device payment, according to an embodiment. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. In some embodiments, method 1100 can be implemented by the payment module of mobile device 330 (FIGS. 3-4), retailer payment system 350 (FIGS. 3-4), and/or POS system 340 (FIGS. 3-4).

Figure 12:
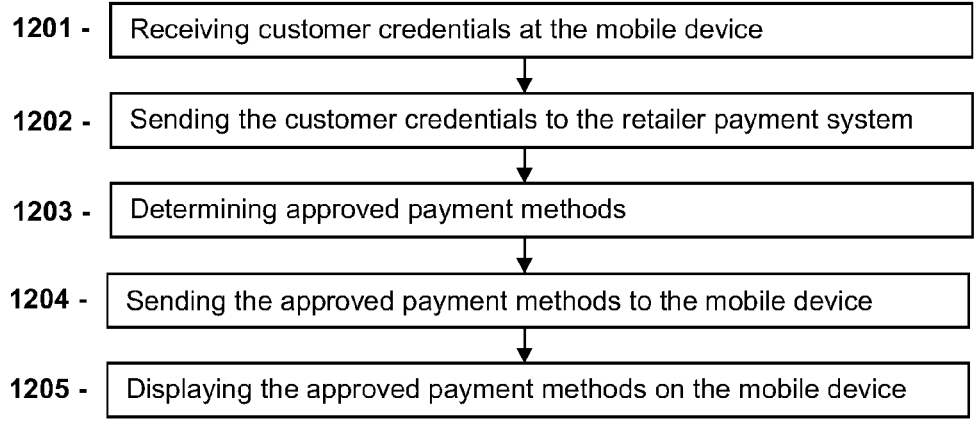
FIG. 12 illustrates a flow chart for a method of optional other steps, according to the embodiment of FIG. 11.

Referring to FIG. 11, in some embodiments method 1100 can include a block 1101 of optional other steps, as shown in FIG. 12 and described below. In some embodiments, method 1100 can skip block 1101 of option other steps.

In many embodiments, method 1100 additionally can include a block 1102 of receiving, at a mobile device, a selected payment method and a payment amount. In a number of embodiments, the mobile device can be similar or identical to mobile device 330 (FIGS. 3-4). In some embodiments, the selected payment method can be received by the mobile device as in block 408 (FIG. 4), described above, and/or as shown in FIGS. 6-8, described above. In various embodiments, the payment amount can be received by the mobile device as in block 408 (FIG. 4), described above, and/or as shown in FIG. 9, described above.

In several embodiments, method 1100 further can include a block 1103 of sending the selected payment method and the payment amount from the mobile device to a retailer payment system. In many embodiments, the retailer payment system can be similar or identical to retailer payment system 350 (FIGS. 3-4). In a number of embodiments, the selected payment method and the payment amount can be sent by the mobile device as in block 408 (FIG. 4), described above, and/or the selected payment method and the payment amount can be received by the retailer payment system as in block 409 (FIG. 4), described above.

In a number of embodiments, method 1100 additionally can include a block 1104 of validating the payment amount using the selected payment method. In some embodiments, the selected payment method can be validated by the retailer payment system and/or one or more external payment systems, such as external payment system 360 (FIG. 6). In a number of embodiments, the selected payment method can be validated as in block 409 (FIG. 4), described above. In some embodiments, block 1104 of validating the payment amount using the selected payment method can include facilitating a user-identity authentication procedure. In some embodiments, the user-identity authentication procedure can be a 3DS procedure, as described above, or another user-identity authentication procedure.

In various embodiments, method 1100 further can include a block 1105 of generating, at the retailer payment system, a gift card for the payment amount. In several embodiments, the gift card can include a gift card identifier. In many embodiments, the gift card can be generated as in block 410 (FIG. 4), described above. In a number of embodiments, the gift card comprises a new gift card. In some embodiments, the gift card can be devoid of being generated as part of a gift-card purchase transaction. For example, the gift card can be generated as an intermediate gift card that is used to process the mobile device payment, and not be generated by the customer directly purchasing a gift card.

In a number of embodiments, method 1100 additionally can include a block 1106 of sending the gift card identifier from the retailer payment system to the mobile device. In some embodiments, the gift card identifier can be sent by the retailer payment system as in block 411 (FIG. 4), described above, and/or the gift card identifier can be received by the mobile device as in block 412 (FIG. 4), described above.

In some embodiments, block 1106 can optionally include a block 1107 of encrypting the gift card identifier at the retailer payment system to generate an encrypted gift card identifier. For example, the gift card identifier can be encrypted as in block 411 (FIG. 4), described above.

In many embodiments, block 1106 further can include a block 1108 of sending the encrypted gift card identifier from the retailer payment system to the mobile device. In some embodiments, the encrypted gift card identifier can be sent by the retailer payment system as in block 411 (FIG. 4), and/or the encrypted gift card identifier can be received by the mobile device as in block 412 (FIG. 4), described above.

In various embodiments, block 1106 additionally can include a block 1109 of decrypting the encrypted gift card identifier at the mobile device. For example, the encrypted gift card identifier can be decrypted as in block 412 (FIG. 4), described above.

Figure 13:
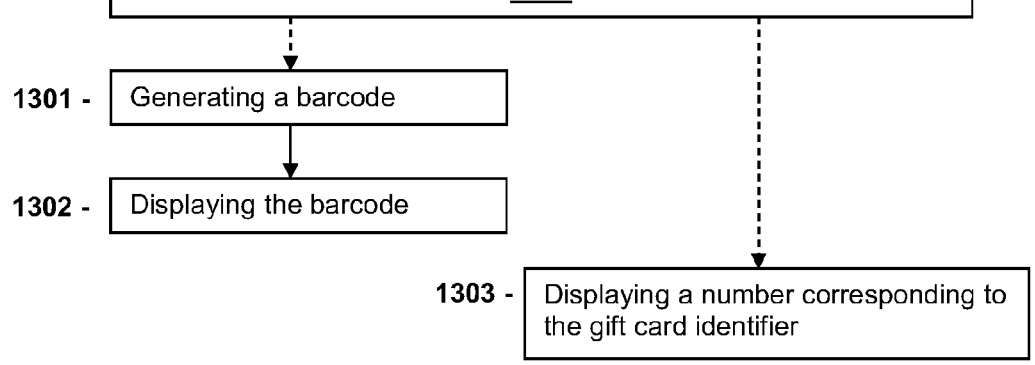
FIG. 13 illustrates a flow chart for a method of displaying the gift card identifier on the mobile device, according to the embodiment of FIG. 11.

In several embodiments, after block 1106, method 1100 further can include a block 1110 of displaying the gift card identifier on the mobile device. In many embodiments, the gift card identifier can be displayed as in block 413 (FIG. 4), described above. For example, block 1110 of displaying the gift card identifier on the mobile device can be implemented as shown in FIG. 13, described below.

In a number of embodiments, method 1100 can optionally include a block 1111 of receiving the gift card identifier at a point-of-sale system. In some embodiments, the point-of-sale system can be similar or identical to POS system 340 (FIGS. 3-4). In many embodiments, the gift card identifier can be received at the point-of sale system such as in block 415 (FIG. 4), described above. In various embodiments, block 1111 can include scanning a barcode displayed on the mobile device. For example, the barcode can be similar or identical to gift card identifier barcode 1011 (FIG. 10). In several embodiments, block 1111 can include receiving a numeric or alphanumeric code corresponding to the gift card identifier. For example, the number corresponding to the gift card identifier can be similar or identical to gift card identifier number 1012 (FIG. 10).

In various embodiments, method 1100 can optionally further include a block 1112 of redeeming the gift card at the point-of-sale system. In many embodiments, the gift card can be redeemed by the point-of-sale system as in block 416 (FIG. 4), described above.

Turning ahead in the drawings, FIG. 12 illustrates a flow chart for block 1101 of optional other steps, according to an embodiment. Block 1101 is merely exemplary and is not limited to the embodiments presented herein. Block 1101 can be employed in many different embodiments or examples not specifically depicted or described herein. In some embodiments, the procedures, the processes, and/or the activities of block 1101 can be performed in the order presented. In other embodiments, the procedures, the processes, and/or the activities of block 1101 can be performed in any suitable order. In still other embodiments, one or more of the procedures, the processes, and/or the activities of block 1101 can be combined or skipped. In various embodiments, block 1101 can be performed prior to block 1102 of receiving, at a mobile device, a selected payment method and/or a payment amount.

In some embodiments, block 1101 can include a block 1201 of receiving customer credentials at the mobile device. In a number of embodiments, the customer credentials can include login information for an account of a customer, such as customer 320 (FIGS. 3-4). In many embodiments, the login information can include a username and password. In various embodiments, the customer credentials can be received at the mobile device as in block 403 (FIG. 4), described above.

In some embodiments, block 1101 additionally can include a block 1202 of sending the customer credentials from the mobile device to the retailer payment system. In various embodiments, the customer credentials can be sent by the mobile device as in block 403 (FIG. 4), described above, and/or the customer credentials can be received by the retailer payment system as in block 404 (FIG. 4), described above. In some embodiments, block 1202 can include encrypting the customer credentials at the mobile device to generate encrypted customer credentials. For example, the customer credentials can be encrypted by the mobile device as in block 403 (FIG. 4), described above. In several embodiments, block 1202 can include sending the encrypted customer credentials from the mobile device to the retailer payment system. For example, the encrypted customer credentials can be sent by the mobile device as in block 403 (FIG. 4), described above, and/or the encrypted customer credentials can be received by the retailer payment system as in block 404 (FIG. 4), described above. In many embodiments, block 1202 can include decrypting the encrypted customer credentials at the retailer payment system. For example, the customer credentials can be decrypted by the retailer payment system as in block 404 (FIG. 4), described above.

In a number of embodiments, block 1101 further can include a block 1203 of determining approved payment methods based at least in part on the customer credentials. In many embodiments, the retailer payment system can determine the approved payment method based on payment methods that have been setup in the customer account. In several embodiments, the retailer payment system can determine the approved payment methods as in block 405 (FIG. 4), described above.

In many embodiments, block 1101 additionally can include a block 1204 of sending the approved payment methods from the retailer payment system to the mobile device. In various embodiments, the approved payment methods can be sent by the retailer payment system as in block 405 (FIG. 4), described above, and/or the approved payment methods can be received by the mobile device as in block 406 (FIG. 4), described above.

In a number of embodiments, block 1101 further can include a block 1205 of displaying the approved payment methods on a screen of the mobile device. In several embodiments, the screen can be similar or identical to screen 331 (FIG. 3). For example, the approved payment methods can be displayed as shown in FIGS. 6-8, described above. In many embodiments, the mobile device can display the approved payment methods as in block 406 (FIG. 4), described above. In many embodiments, the approved payment methods can include the selected payment method.

Turning ahead in the drawings, FIG. 13 illustrates a flow chart for block 1110 of displaying the gift card identifier on the mobile device, according to an embodiment. Block 1110 is merely exemplary and is not limited to the embodiments presented herein. Block 1110 can be employed in many different embodiments or examples not specifically depicted or described herein. In some embodiments, the procedures, the processes, and/or the activities of block 1110 can be performed in the order presented. In other embodiments, the procedures, the processes, and/or the activities of block 1110 can be performed in any suitable order. In still other embodiments, one or more of the procedures, the processes, and/or the activities of block 1110 can be combined or skipped.

In many embodiments, block 1110 can optionally include a block 1301 of generating a barcode corresponding to the gift card identifier. In a number of embodiments, the barcode can be similar or identical to gift card identifier barcode 1011 (FIG. 10). In various embodiments, the barcode can be generated by the mobile device as in block 413 (FIG. 4), described above.

In several embodiments, block 1110 can next include a block 1302 of displaying the barcode on a screen of the mobile device. In several embodiments, the screen can be similar or identical to screen 331 (FIG. 3). In many embodiments, the barcode can be displayed on the screen of the device as shown in FIG. 10, described above. In a number of embodiments, the barcode can be displayed on the screen of the device as in block 413 (FIG. 4), described above.

In some embodiments, block 1110 can optionally include a block 1303 of displaying a number corresponding to the gift card identifier on a screen of the mobile device. In several embodiments, the screen can be similar or identical to screen 331 (FIG. 3). In several embodiments, the number can be similar or identical to gift card identifier number 1012 (FIG. 10), and/or can be displayed on the mobile device as shown in FIG. 10, described above. In a number of embodiments, the number can be displayed on the screen of the mobile device as in block 413 (FIG. 4), described above.

Figure 14:
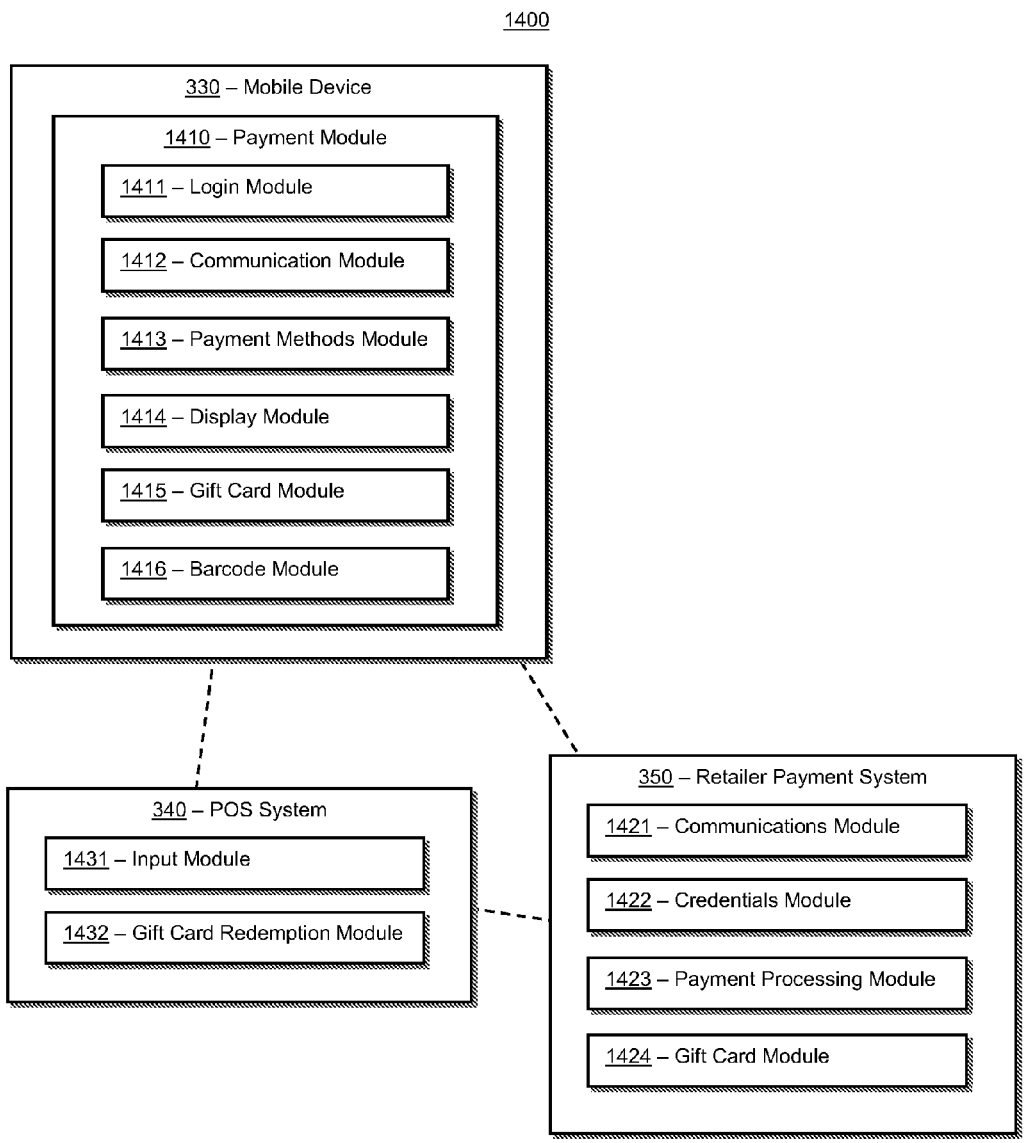
FIG. 14 illustrates a block diagram of a system, which shows a portion of the system of FIG. 3.

Turning ahead in the drawings, FIG. 14 illustrates a block diagram of system 1400, which can include elements of and/or be a portion of system 300 shown in FIG. 3. Mobile device 330, POS system 340, and/or retailer payment system 350 are merely exemplary and are not limited to the embodiments presented herein. Mobile device 330, POS system 340, and/or retailer payment system 350 can be employed in many different embodiments or examples not specifically depicted or described herein. In some embodiments, certain elements or modules of mobile device 330, POS system 340, and/or retailer payment system 350 can perform various procedures, processes, and/or acts. In other embodiments, the procedures, processes, and/or acts can be performed by other suitable elements or modules.

In some embodiments, mobile device 330 can include a payment module 1410. Payment module 1410 can be a mobile application configured to run on mobile device 330. In many embodiments, payment module 1410 can be configured to receive customer credentials, such as in block 403 (FIG. 4) and/or block 1201 (FIG. 12). In a number of embodiments, payment module 1410 can be configured to send the customer credentials to the retailer payment system, such as in block 403 (FIG. 4) and/or block 1202 (FIG. 12). In some embodiments, payment module 1410 can be configured to receive approved payment methods from the retailer payment system, such as in block 406 (FIG. 4) and/or block 1204 (FIG. 12). In a number of embodiments, payment module 1410 can be configured to display the approved payment methods from the retailer payment system, such as in block 406 (FIG. 6) and/or block 1205 (FIG. 12). In many embodiments, payment module 1410 can be configured to receive a selected payment method and a payment amount, such as in block 408 (FIG. 4) and/or block 1102 (FIG. 11). In several embodiments, the payment module 1410 can be configured to receive the gift card identifier from the retailer payment system, such as in block 412 (FIG. 4) and/or block 1106 (FIG. 11). In a number of embodiments, payment module 1410 can be configured to display the gift card identifier on a screen of the mobile device, such as in block 413 (FIG. 4) and/or block 1110 (FIG. 11), and/or as shown in FIG. 10. In many embodiments, payment module 1410 can be configured to generate a barcode corresponding to the gift card identifier, such as in block 413 (FIG. 4) and/or block 1301 (FIG. 13). In some embodiments, payment module 1410 can be configured to display the barcode on the screen of the mobile device, such as in block 413 (FIG. 4) and/or block 1302 (FIG. 13), and/or as shown in FIG. 10.

In several embodiments, payment module 1410 can include various modules. In some embodiments, payment module 1410 can include a login module 1411. In certain embodiments, login module 1411 can perform at least a portion of block 403 of the mobile device receiving the credentials from the customer and/or encrypting the credentials, and/or block 1201 (FIG. 12) of receiving customer credentials at the mobile device.

In many embodiments, payment module 1410 additionally can include a communications module 1412. In certain embodiments, communications module 1412 can perform at least a portion of block 403 (FIG. 4) of the mobile device sending the encrypted credentials to the retailer payment system, block 406 (FIG. 4) of the mobile device receiving the approved payment methods, block 408 (FIG. 4) of the mobile device sending the payment method and/or payment amount to retailer payment system, block 412 (FIG. 4) of the mobile device receiving the encrypted gift card information, block 1103 (FIG. 11) of sending the selected payment method and the payment amount from the mobile device to a retailer payment system, and/or block 1202 (FIG. 12) of sending the customer credentials from the mobile device to the retailer payment system.

In various embodiments, payment module 1410 further can include a payment methods module 1413. In certain embodiments, payment methods module 1413 can perform at least a portion of block 408 (FIG. 4) of the mobile device receiving the payment method and/or payment amount, and/or block 1102 (FIG. 11) of receiving, at a mobile device, a selected payment method and a payment amount In some embodiments, payment module 1410 additionally can include a display module 1414. In certain embodiments, display module 1414 can perform at least a portion of block 406 (FIG. 4) of the mobile device displaying the approved payment methods, block 413 (FIG. 4) of displaying the barcode and/or gift card information, block 1110 (FIG. 11) of displaying the gift card identifier on the mobile device, block 1205 (FIG. 12) of displaying the approved payment methods on a screen of the mobile device, block 1302 (FIG. 13) of displaying the barcode on a screen of the mobile device, and/or block 1303 (FIG. 13) of displaying a number corresponding to the gift card identifier on a screen of the mobile device.

In various embodiments, payment module 1410 further can include a gift card module 1415. In certain embodiments, gift card module 1415 can perform at least a portion of block 412 (FIG. 4) of decrypting the gift card information, and/or block 1109 (FIG. 11) of decrypting the encrypted gift card identifier at the mobile device.

In a number of embodiments, payment module 1410 additionally can include a barcode module 1416. In certain embodiments, barcode module 1416 can perform at least a portion of block 413 (FIG. 4) of the mobile device generating a barcode, and/or block 1301 (FIG. 13) of generating a barcode corresponding to the gift card identifier.

In some embodiments, retailer payment system 350 can be configured to communicate with payment module 1410 on mobile device 330. In various embodiments, retailer payment system 350 can be configured to determine the approved payment methods based at least in part on the customer credentials, such as in block 404 (FIG. 4) and/or block 1104 (FIG. 11). In a number of embodiments, retailer payment system 350 can be configured to receive the selected payment method and the payment amount from the payment module, such as in block 409 (FIG. 4) and/or block 1103 (FIG. 13). In some embodiments, retailer payment system 350 can be configured to at least partially validate the payment amount using the selected payment method, such as in block 409 (FIG. 4) and/or block 1104 (FIG. 11). In several embodiments, retailer payment system 350 can be configured to generate a gift card for the payment amount, such as in block 410 (FIG. 4) and/or block 1105 (FIG. 11).

In several embodiments, retailer payment system 350 can include various modules, which can be configured to run on retailer payment system 350. In some embodiments, retailer payment system 350 can include a communications module 1421. In certain embodiments, communications module 1421 can perform at least a portion of block 404 (FIG. 4) of the retailer payment system receiving the encrypted credentials, block 405 (FIG. 4) of the retailer payment system sending the approved payment methods to the mobile device, block 409 (FIG. 4) of the retailer payment system receiving the payment method and/or payment amount, block 411 (FIG. 4) of the retailer payment system encrypting the gift card information and/or sending the gift information to the mobile device, block 1106 (FIG. 11) of sending the gift card identifier from the retailer payment system to the mobile device, block 1108 (FIG. 11) of sending the encrypted gift card identifier from the retailer payment system to the mobile device, and/or block 1204 (FIG. 12) of sending the approved payment methods from the retailer payment system to the mobile device.

In various embodiments, retailer payment system 350 further can include a credentials module 1422. In certain embodiments, credentials module 1422 can perform at least a portion of block 404 (FIG. 4) of the retailer payment system decrypting the encrypted credentials and/or validating the credentials.

In some embodiments, retailer payment system 350 additionally can include a payment processing module 1423. In certain embodiments, payment processing module 1423 can perform at least a portion of block 405 (FIG. 4) of the retailer payment system determining approved payment methods for the customer, block 409 (FIG. 4) of the retailer payment system validating the payment amount with the payment method, block 1104 (FIG. 11) of validating the payment amount using the selected payment method, and/or block 1203 (FIG. 12) of determining approved payment methods based at least in part on the customer credentials.

In various embodiments, retailer payment system 350 further can include a gift card module 1424. In certain embodiments, gift card module 1424 can perform at least a portion of block 410 (FIG. 4) of the retailer payment system generating a gift card for the payment amount, block 411 (FIG. 4) of the retailer payment system encrypting the gift card information, block 1105 (FIG. 11) of generating, at the retailer payment system, a gift card for the payment amount, and/or block 1107 (FIG. 11) of encrypting the gift card identifier at the retailer payment system to generate an encrypted gift card identifier.

In some embodiments, POS system 340 can be configured to receive the gift card identifier displayed on the screen of the mobile device, such as in block 415 (FIG. 4) and/or block 1111 (FIG. 11). In a number of embodiments, POS system 340 can be configured to scan the barcode using scanner 341 (FIG. 3), such as in block 415 (FIG. 4) and/or block 1111 (FIG. 11). In various embodiments, POS system 340 can be configured to redeem the gift card, such as in block 416 (FIG. 4) and/or block 1112 (FIG. 11).

In several embodiments, POS system 340 can include various modules, which can be configured to run on POS system 340. In some embodiments, POS system 340 can include an input module 1431. In certain embodiments, input module 1431 can perform at least a portion of block 415 (FIG. 4) of the POS system scanning the gift card identifier barcode, receiving the gift card identifier number, and/or otherwise receiving the gift card identifier for the gift card generated by the retailer payment system, and/or block 1111 (FIG. 11) of receiving the gift card identifier at a point-of-sale system.

In various embodiments, POS system 340 can include a gift card redemption module 1432. In certain embodiments, gift card redemption module 1432 can perform at least a portion of block 416 (FIG. 4) of the POS system redeeming the gift card, and/or block 1112 (FIG. 12) of redeeming the gift card at the point-of-sale system.

Although mobile device payment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-14 may be modified, and that the foregoing discussion of certain of these embodiments does not necessarily represent a complete description of all possible embodiments. For example, one or more of the procedures, processes, or activities of FIGS. 4 and 11-13 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a payment module configured to be executed on a mobile device and further configured to receive a payment method and a payment amount; and
a retailer payment system configured to communicate with the payment module on the mobile device;
wherein:
the retailer payment system is further configured to:
receive the payment method and the payment amount from the payment module;
at least partially validate the payment amount; and
generate a gift card for the payment amount, the gift card comprising a gift card identifier;
the payment module is further configured to:
receive the gift card identifier from the retailer payment system; and
facilitate display of the gift card identifier on a screen of the mobile device; and
the gift card is devoid of being generated as part of a gift-card purchase transaction.

2. The system of claim 1 further comprising:
a point-of-sale system,
wherein:
the point-of-sale system is configured to receive the gift card identifier displayed on the screen of the mobile device.

3. The system of claim 2, wherein:
the point-of-sale system comprises a scanner;
the payment module is further configured to:
generate a barcode corresponding to the gift card identifier; and
facilitate display of the barcode on the screen of the mobile device; and
the point-of-sale system is configured to scan the barcode using the scanner.

4. The system of claim 2, wherein:
the point-of-sale system is further configured to redeem the gift card.

5. The system of claim 1, wherein:
the payment module is further configured to:
receive at least one customer credential;
send the at least one customer credential to the retailer payment system;
receive at least one approved payment method from the retailer payment system; and
display the at least one approved payment method from the retailer payment system;
the retailer payment system is further configured to:
determine the at least one approved payment method based at least in part on the at least one customer credential; and
the at least one approved payment method comprises the payment method.

6. The system of claim 1, wherein:
the gift card comprises a new gift card.

7. The system of claim 1, wherein:
the retailer payment system is further configured to:
encrypt the gift card identifier to generate an encrypted gift card identifier; and
send the encrypted gift card identifier to the mobile device;
the payment module configured to receive the gift card identifier from the retailer payment system further comprises the payment module configured to receive the encrypted gift card identifier from the retailer payment system; and
the payment module is further configured to decrypt the encrypted gift card identifier.

8. A method comprising:
receiving, from a mobile device, a payment method and a payment amount;
validating the payment amount;
generating a gift card for the payment amount, wherein the gift card comprises a gift card identifier;
sending the gift card identifier to the mobile device; and
facilitating displaying the gift card identifier on the mobile device,
wherein:
the gift card is devoid of being generated as part of a gift-card purchase transaction.

9. The method of claim 8 further comprising:
receiving the gift card identifier at a point-of-sale system.

10. The method of claim 9, wherein:
receiving the gift card identifier at the point-of-sale system comprises:
    scanning a barcode displayed on the mobile device.
11. The method of claim 9, wherein:
receiving the gift card identifier at the point-of-sale system comprises:
    receiving a number corresponding to the gift card identifier.
12. The method of claim 9 further comprising:
redeeming the gift card at the point-of-sale system.
13. The method of claim 8, wherein:
validating the payment amount comprises:
    facilitating a user-identity authentication procedure.
14. The method of claim 8, wherein:
the gift card comprises a new gift card.
15. The method of claim 8, wherein:
sending the gift card identifier to the mobile device comprises:
    encrypting the gift card identifier to generate an encrypted gift card identifier;
    sending the encrypted gift card identifier to the mobile device; and
    decrypting the encrypted gift card identifier at the mobile device.
16. The method of claim 8, wherein:
facilitating displaying the gift card identifier on the mobile device comprises:
    generating a barcode corresponding to the gift card identifier; and
    facilitating displaying the barcode on a screen of the mobile device.
17. The method of claim 8, wherein:
facilitating displaying the gift card identifier on the mobile device comprises:
    facilitating displaying a number corresponding to the gift card identifier on a screen of the mobile device.
18. The method of claim 8 further comprising:
before receiving the payment method:
    receiving at least one customer credential from the mobile device;
    determining at least one approved payment method based at least in part on the at least one customer credential; and
    sending the at least one approved payment method to the mobile device for display on a screen of the mobile device.
19. The method of claim 18, wherein:
the at least one approved payment method comprises the payment method.
20. The method of claim 18, wherein:
receiving the at least one customer credential from the mobile device comprises:
    receiving the at least one customer credential in an encrypted format; and
decrypting the at least one customer credential in the encrypted format.

* * * * *